United States Patent
Sawasaki et al.

(10) Patent No.: US 7,304,712 B2
(45) Date of Patent: Dec. 4, 2007

(54) LIQUID CRYSTAL DISPLAY DEVICE AND MANUFACTURING METHOD THEREOF

(75) Inventors: Manabu Sawasaki, Kawasaki (JP);
Yoji Taniguchi, Kawasaki (JP);
Takashi Takagi, Kawasaki (JP)

(73) Assignees: Fujitsu Limited, Kawasaki (JP); Au Optronics Corporation, Hsinchu (TW)

( * ) Notice: Subject to any disclaimer, the term of this patent is extended or adjusted under 35 U.S.C. 154(b) by 175 days.

(21) Appl. No.: 10/873,839

(22) Filed: Jun. 21, 2004

(65) Prior Publication Data

US 2005/0140914 A1 Jun. 30, 2005

(30) Foreign Application Priority Data

Dec. 26, 2003 (JP) .............................. 2003-433082

(51) Int. Cl.
*G02F 1/1339* (2006.01)
(52) U.S. Cl. ..................... 349/156; 349/155; 349/191
(58) Field of Classification Search ................ 349/155, 349/156, 157, 191
See application file for complete search history.

(56) References Cited

U.S. PATENT DOCUMENTS

| | | | |
|---|---|---|---|
| 6,067,144 | A | 5/2000 | Murouchi |
| 6,417,908 | B2* | 7/2002 | Nishiguchi et al. ......... 349/155 |
| 6,466,295 | B1* | 10/2002 | Hsieh .......................... 349/155 |
| 6,836,308 | B2 | 12/2004 | Sawasaki et al. |
| 2001/0026347 | A1 | 10/2001 | Sawasaki et al. ........... 349/156 |
| 2004/0114087 | A1* | 6/2004 | Cho et al. .................... 349/155 |
| 2005/0024567 | A1 | 2/2005 | Sawasaki et al. |
| 2005/0099577 | A1* | 5/2005 | Lee et al. ................... 349/155 |

FOREIGN PATENT DOCUMENTS

| | | |
|---|---|---|
| JP | 09-080444 | 3/1997 |
| JP | 2001-201750 | 7/2001 |
| JP | 2002-162629 | 6/2002 |
| JP | 2002-202512 | 7/2002 |
| JP | 2003-156750 | 5/2003 |

* cited by examiner

*Primary Examiner*—Huyen Ngo
(74) *Attorney, Agent, or Firm*—Greer, Burns & Crain, Ltd

(57) ABSTRACT

The present invention relates to a liquid crystal display device that is used in display portions of electronics devices and a manufacturing method thereof, and intends to provide a liquid crystal display device that can obtain excellent display quality and a manufacturing method thereof. The method of manufacturing a liquid crystal display device includes preparing a pair of substrates that have a structure P1 having a height Hp1 and a structure P2 having a height Hp2, the heights Hp1 and Hp2 satisfying a relationship of 0.3 (μm)≦Hp1−Hp2≦1.0 (μm); controlling a dropping amount V of liquid crystal so that a cell gap G1 that is determined by the dropping amount V of liquid crystal, the height Hp1 and the height Hp2 satisfy a relationship of Hp2<G1<Hp1; dropping the controlled dropping amount V of liquid crystal on one of the pair of substrates; and attaching the pair of substrates in a vacuum followed by returning to an atmospheric pressure to fill in the liquid crystal between the pair of substrates.

4 Claims, 18 Drawing Sheets

FIG.13A
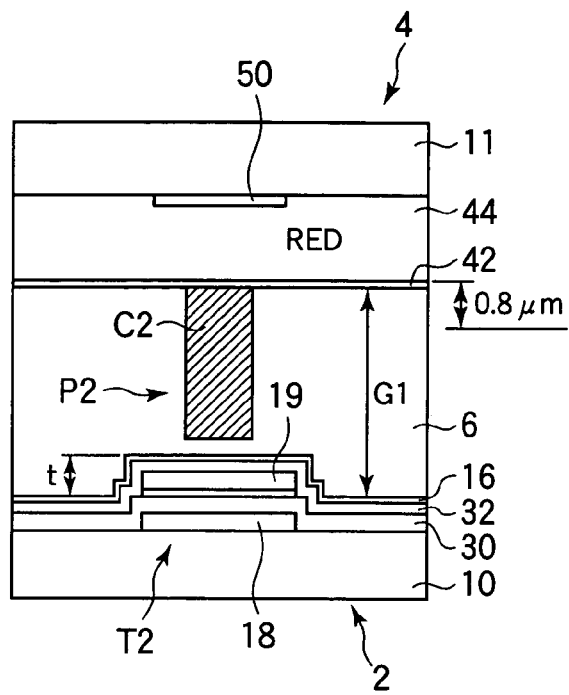
FIG.13B
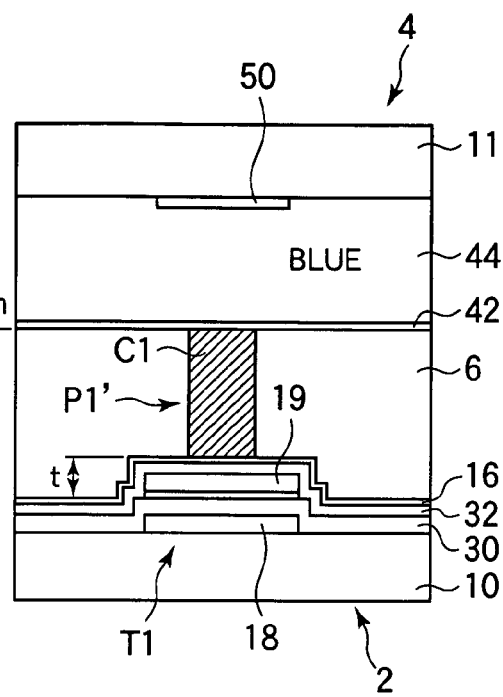
FIG.14

RED  GREEN  BLUE

LIQUID CRYSTAL DISPLAY DEVICE AND MANUFACTURING METHOD THEREOF

BACKGROUND OF THE INVENTION

1. Field of the Invention

The present invention relates to a liquid crystal display device used for a display portion of an electronics device and a method of manufacturing the same.

2. Description of the Related Art

A liquid crystal display device generally has two substrates each provided with a transparent electrode and a liquid crystal layer interposed between both of the substrates. In a liquid crystal display device, a predetermined voltage is applied between the transparent electrodes to drive a liquid crystal and the light transmittance is controlled for each of pixels, and thereby a desired display is obtained. In recent years, a market of the liquid crystal display devices is expanding and there are various demands for the liquid crystal display devices. Among these, a demand for improvement in display quality is particularly strong. In order to obtain excellent display without brightness unevenness, a technology in which pillar spacers are formed on a substrate to uniformly control a thickness (cell gap) of a liquid crystal layer is becoming a mainstream.

Existing pillar spacers are disposed in a predetermined arrangement pattern in a substrate surface. These pillar spacers support a gap between a thin film transistor (TFT) substrate and an opposite substrate that are attached to each other. As formation materials of the pillar spacers, in general, resinous materials such as acrylic resins and novolac resins are used. However, these resinous materials have, from the physical properties thereof, an elastic deformation region and a plastic deformation region. When a local force is applied from the outside of a panel, the pillar spacers undergo the plastic deformation; that is, even after the force was removed, the pillar spacers do not restore an original height. Accordingly, in a loaded portion where the local force is applied, cell gap unevenness is caused. In order to inhibit the cell gap unevenness from occurring, the number of the pillar spacers may be increased or a pillar area of the pillar spacer may be increased to make the liquid crystal panel harder. However, when a density of the pillar spacers is made excessively high, relative to a volume decrease of liquid crystal under low temperatures, the pillar spacer prevents accompanying deformation, a vacuum region is generated, resulting in a problem that bubbles are generated there. Accordingly, the arrangement density of the pillar spacers cannot be made so high; that is, there is an upper limit on the arrangement density. In the pillar spacers at the arrangement density under this restriction, the resistance of the cell gap against an external local pressurization cannot be sufficiently obtained.

In order to solve the problem, patent document 1 discloses a technology in which two kinds of pillar spacers having different heights are formed. Furthermore, patent document 2 discloses a technology in which pillar spacers are disposed in two or more kinds of arrangement patterns, and by making use of steps of film thickness on the TFT substrate side, when substrates are attached, two kinds of pillar spacers practically different in height are formed. The liquid crystal display devices described in patent documents 1 and 2 include first pillar spacers that sustain the cell gap during normal and low temperatures and second pillar spacers that sustain the cell gap when a local pressure is externally applied, and thereby these have a structure that does not cause bubbles at low temperatures and can stand even the external local pressurization.

Now, a method of manufacturing the above liquid crystal display device will be explained. In FIGS. 22A through 22E, existing manufacturing steps of a liquid crystal display device are shown. In FIGS. 23A through 23D, states in the respective steps of two kinds of pillar spacers having different heights are schematically shown. Firstly, as shown in FIGS. 22A and 23A, on an outer periphery of one substrate 104 on which two kinds of pillar spacers 140 and 142 different in height are formed, a sealing material 120 is coated so that part thereof is opened as a liquid crystal injection port 122.

In the next place, as shown in FIG. 22B, one substrate 104 and the other substrate 102 are attached through the sealing material 120, and thereby a vacant cell 108 is formed. At this time, as shown in FIG. 23B, a first pillar spacer 140 higher in the height comes into contact with the other substrate 102 and a second pillar spacer 142 lower in the height does not come into contact with the substrate 102.

Subsequently, the vacant cell 108 is transferred into a not shown liquid crystal injector followed by evacuating the inside of the liquid crystal injector. Thereafter, the liquid crystal injection port 122 of the vacant cell 108 is brought into contact with liquid crystal 106 filled in a liquid crystal dish 124 followed by releasing the inside of the liquid crystal injector to air. Thereby, as shown in FIGS. 22C and 23C, the liquid crystal 106 is injected into the vacant cell 108.

After the vacant cell 108 filled by the liquid crystal 106 is taken out of the liquid crystal injector, as shown in FIG. 22D, both substrates 102 and 104 are pressurized under a definite pressure (shown with a bold arrow mark in the drawing), and thereby excessive liquid crystal 106 is extruded and thereby a cell gap is controlled. At this time, as shown in FIG. 23D, the substrate 102 comes relatively nearer by a definite distance to the substrate 104 from a position shown with a broken line in the drawing. Thereby, the first pillar spacer 140 is compressed by a definite displacement amount. The displacement amount is controlled so as to be smaller than difference of heights between the first and second pillar spacers 140 and 142; accordingly, the second pillar spacer 142 does not come into contact with the substrate 102. Thereafter, the liquid crystal injection port 122 is sealed with a sealant 126, and thereby a liquid crystal panel 110 is prepared.

Thus, according to the existing liquid crystal injection method (vacuum injection method), a definite pressure is applied between both substrates 102 and 104 and excessive liquid crystal 106 is discharged from the liquid crystal injection port 122. Accordingly, an internal pressure of the liquid crystal panel 110 is controlled constant and the compression displacement amount of the first pillar spacer 140 becomes constant. The prepared liquid crystal display device includes the first pillar spacers 140 that sustain the cell gap during normal temperatures and low temperatures and the second pillar spacers 142 that sustain the cell gap when the local pressure is applied; accordingly, bubbles are not generated at low temperatures and the external local pressure can be withstood.

Recently, as means for realizing shortening of liquid crystal injection time, a liquid crystal dropping (ODF; One Drop Filling) method where substrates attaching and liquid crystal injection are simultaneously carried out is becoming popular. In FIGS. 24A through 24C, manufacturing steps of a liquid crystal display device in which the ODF method is applied are shown. In FIGS. 25A and 25B, states of two kinds of pillar spacers 140 and 142 different in the height are schematically shown for the respective steps.

Firstly, as shown in FIGS. 24A and 25A, on the whole circumference of an outer periphery of one substrate 104, a sealing material 120 is coated in seamless manners. Subsequently, as shown in FIGS. 24B and 25B, a predetermined amount of liquid crystal 106 is dropped on the substrate 104 (or the other substrate 102) by use of a dispenser. Still subsequently, as shown in FIG. 24C, both substrates 102 and 104 are attached in a vacuum followed by returning to an atmospheric pressure, and thereby the liquid crystal 106 is injected. At this time, the cell gap is controlled by a dropping amount of the liquid crystal 106, and the first pillar spacers 104 are compressed by a predetermined displacement amount.

The first and second pillar spacers 140 and 142 are formed with a certain degree (substantially 0.1 to 0.2 µm) of dispersion between the heights thereof. Accordingly, when a definite amount of the liquid crystal 106 is always dropped, depending on the heights of the first pillar spacers 140, an internal pressure of the liquid crystal 106 varies. Accordingly, after the substrates are attached, the dispersion is also caused in the compression displacement amounts of the first pillar spacers 140.

FIGS. 26A, 26B, 27A and 27B show states before and after the attaching of the substrates of a liquid crystal display device that is manufactured by use of the ODF method. FIGS. 26A and 27A show the pillar spacers 140 and 142 before the attaching of the substrates, and FIGS. 26B and 27B show the pillar spacers 140 and 142 after the attaching of the substrates. As show in FIGS. 26A and 26B, in the liquid crystal display device, a cell gap G that is determined by a dropping amount of the liquid crystal 106, a height H1 of the first pillar spacer 140 and a height H2 of the second pillar spacer 142 satisfy G<H1 and G<H2. Accordingly, after the attaching of the substrates, both the first and second pillar spacers 140 and 142 sustain the cell gap G and the compression displacement amounts of the first and second pillar spacers 140 and 142 become larger; accordingly, the internal pressure becomes lower. As a result, the first and second pillar spacers 140 and 142 prevent deformation following a decrease in volume of the liquid crystal 106 at low temperatures, resulting in foaming at low temperatures.

On the other hand, in a liquid crystal display device shown in FIGS. 27A and 27B, a cell gap G that is determined by a dropping amount of the liquid crystal 106, a height H1 of the first pillar spacer 140 and a height H2 of the second pillar spacer 142 satisfy G>H1 and G>H2. Accordingly, after the attaching of the substrates, the first and second pillar spacers 140 and 142, not coming into contact with the other substrate 102, are not compressed, and a higher internal pressure results. Accordingly, gravity unevenness is caused and the resistance against the external local pressure cannot be obtained.

Thus there is a problem in that a liquid crystal display device that does not cause foaming at low temperatures, can resist against the external local pressurization and can exhibit excellent display quality cannot be manufactured according to the ODF method.

[Patent document 1] JP-A-2001-201750
[Patent document 2] JP-A-2003-156750
[Patent document 3] JP-A-2002-202512

SUMMARY OF THE INVENTION

In view of the above situations, an object of the present invention is to provide a liquid crystal display device capable of obtaining excellent display quality and a method of manufacturing the same.

The above object can be achieved according to a manufacturing method of a liquid crystal display device characterized in that a pair of substrates that have a structure P1 having a height Hp1 and a structure P2 having a height Hp2, the heights Hp1 and Hp2 satisfying the relationship of 0.3 (µm)≦Hp1−Hp2≦1.0 (µm); a dropping amount V of liquid crystal is controlled so that a cell gap G1 that is determined by the dropping amount V of the liquid crystal and the heights Hp1 and Hp2 may satisfy the relationship of Hp2<G1<Hp1; the controlled dropping amount V of liquid crystal is dropped on one of the pair of substrates; the pair of substrates are attached in a vacuum; and by returning to an atmospheric pressure the liquid crystal is injected between the pair of substrates.

According to the present invention, a liquid crystal display device capable of obtaining excellent display quality can be realized.

BRIEF DESCRIPTION OF THE DRAWINGS

FIGS. 13A and 13B are diagrams showing sectional constitutions of a liquid crystal display device according to embodiment 2 of one implementation mode of the invention;

FIG. 14 is a diagram showing an arrangement of structures P1 and P2 of a liquid crystal display device according to embodiment 2 of one implementation mode of the invention;

DESCRIPTION OF THE PREFERRED EMBODIMENTS

A liquid crystal display device according to one implementation mode of the present invention and a method of manufacturing the same will be explained with reference to FIGS. 1 through 21. Firstly, a principle of an implementation mode will be explained.

Figure 22A:
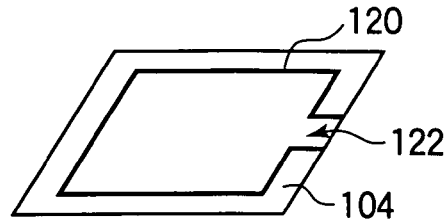
FIGS. 22A through 22E are diagrams showing an existing manufacturing method of a liquid crystal display device in which a vacuum injection method is applied.
Figure 22B:
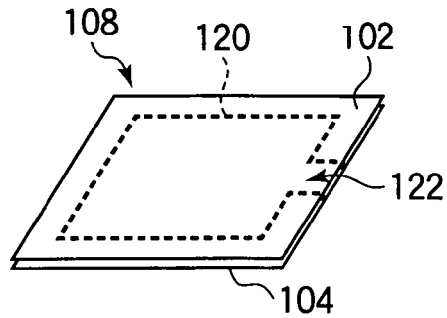
Figure 22C:
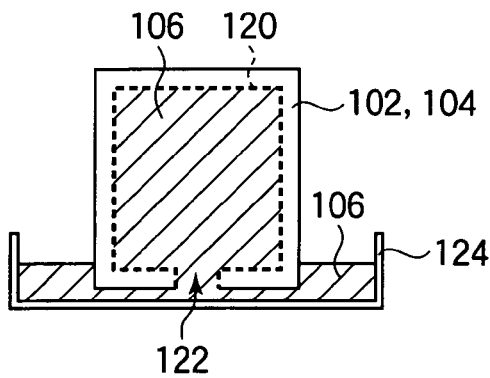
Figure 22D:
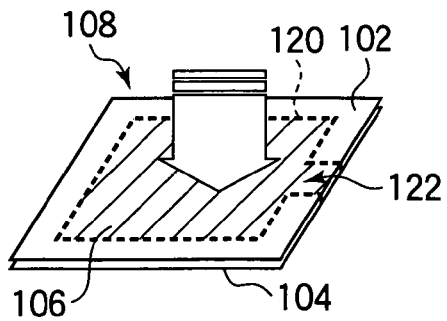
Figure 22E:
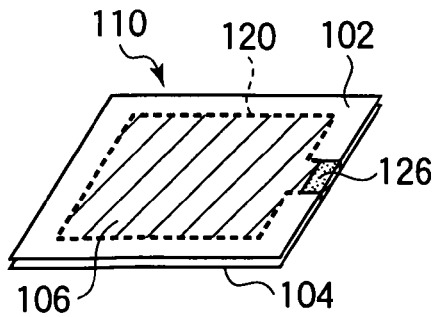
Figure 23A:
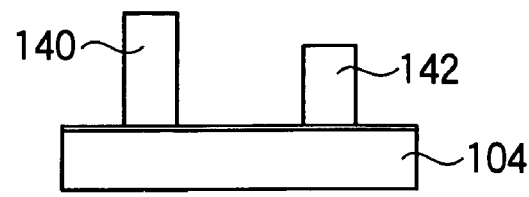
FIGS. 23A through 23D are diagrams schematically showing states in the respective steps of pillar spacers.
Figure 23B:
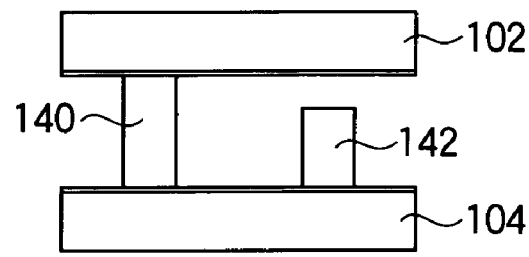
Figure 23C:
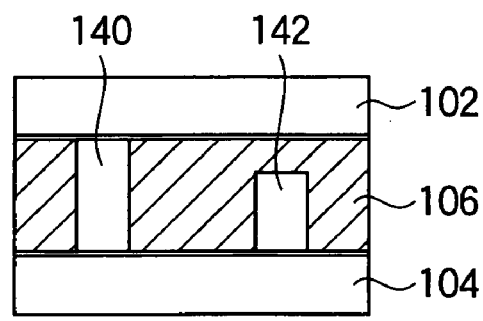
Figure 23D:
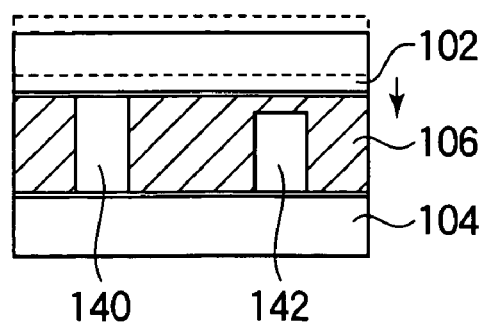
Figure 24A:
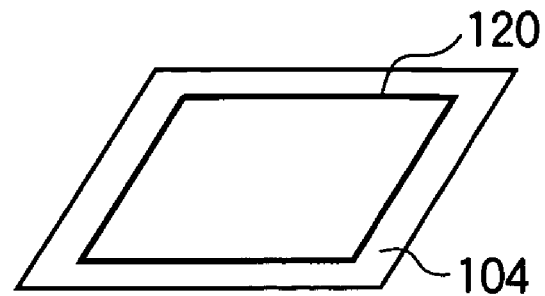
FIGS. 24A through 24C are diagrams showing an existing manufacturing method of a liquid crystal display device in which an ODF method is applied.
Figure 24B:
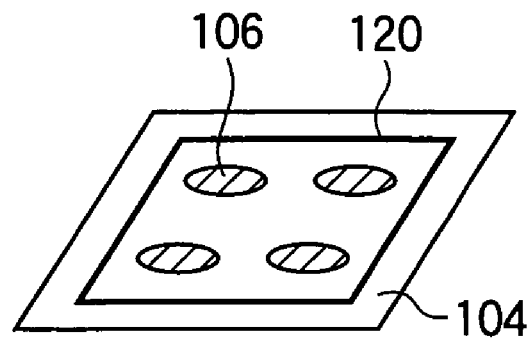
Figure 24C:
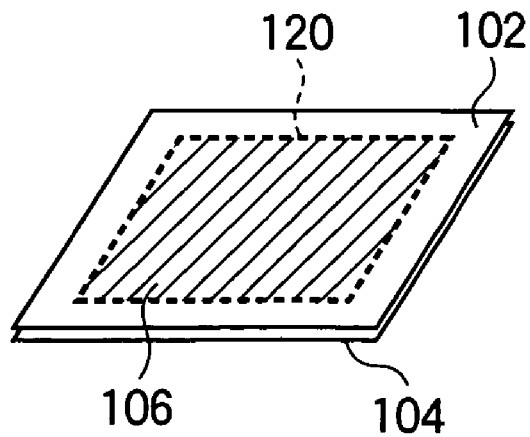
Figure 25A:
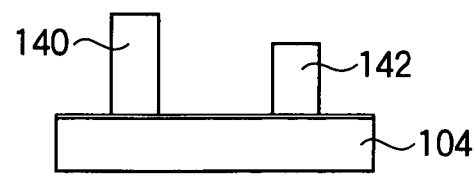
FIGS. 25A and 25B are diagrams schematically showing states in the respective steps of the pillar spacers.
Figure 25B:
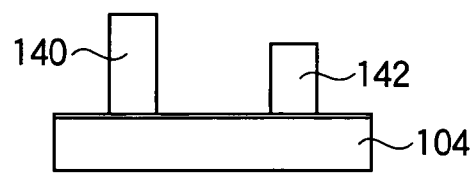
Figure 26A:
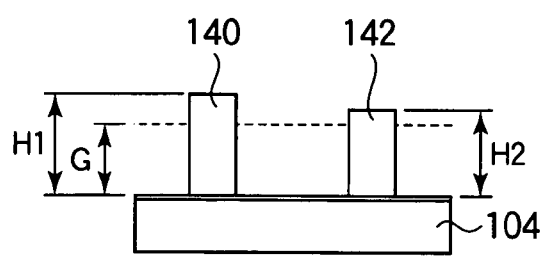
FIGS. 26A and 26B are diagrams schematically showing states of the pillar spacers before and after the attaching of substrates.
Figure 26B:
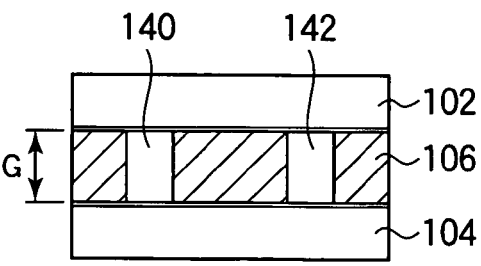
Figure 27A:
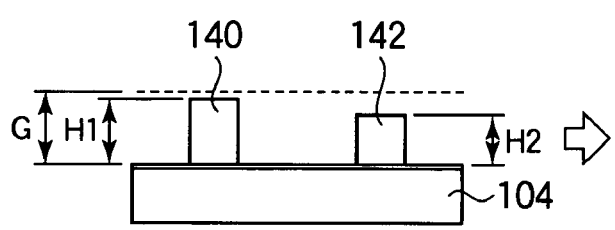
FIGS. 27A and 27B are diagrams schematically showing states of the pillar spacers before and after the attaching of substrates.
Figure 27B:
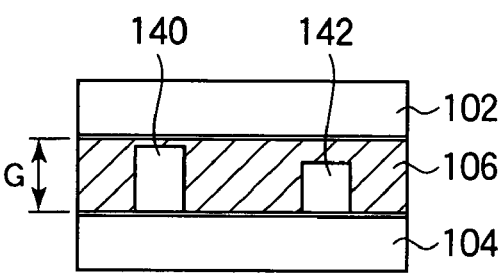

In general, there is dispersion of substantially 0.1 to 0.2 μm in the heights of pillar spacers formed on a substrate. In the case of a definite dropping amount of liquid crystal being dropped in a manufacturing method of a liquid crystal display device that uses an ODF method, also in amounts of compression displacements of the pillar spacers after the substrates are attached, dispersion of substantially 0.1 to 0.2 μm is caused. That is, even when first pillar spacers high in the height and second pillar spacers low in the height are formed on one substrate, when the difference between the first and second pillar spacers is small (for instance, less than 0.3 μm), even the second pillar spacers, after the attaching of the substrates, in some cases, may come into contact with the other substrate. When both of the first and second pillar spacers come into contact with the other substrate under normal temperatures, bubbles are generated under low temperatures. In order to inhibit this from occurring, in the present implementation mode, the difference between the heights of the first and second pillar spacers is set at 0.3 μm or more and 1.0 μm or less. In a manufacturing method of a liquid crystal display device that uses a vacuum injection method, even when the difference of the heights of the first and second pillar spacers is less than 0.3 μm, in a step shown in FIG. 22D, an amount of the compression displacement of the first pillar spacers can be made constant (for instance, 0.15 μm). Accordingly, a problem in that the second pillar spacers, after the attaching of the substrates, come into contact with the other substrate is not caused.

In the method of manufacturing a liquid crystal display device by use of the ODF method, in the case of the first and second pillar spacers being formed, as to the difference of the heights of the first and second pillar spacers and the arrangement density thereof, the dispersions caused by reasons due to processes are necessary to be sufficiently taken into consideration in designing. Furthermore, in accordance with the heights of the first and second pillar spacers, a dropping amount of the liquid crystal is necessarily determined.

Figure 1A:
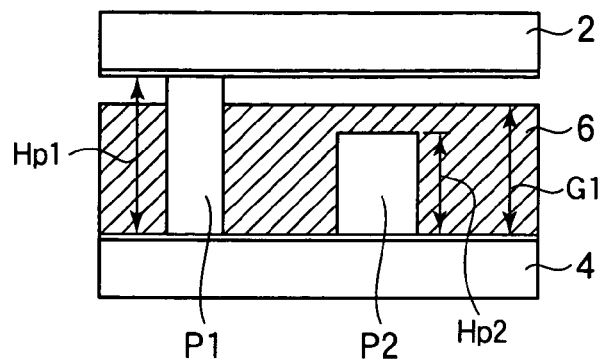
FIGS. 1A and 1B are sectional views schematically showing a manufacturing method of a liquid crystal display device according to one implementation mode of the present invention.
Figure 1B:
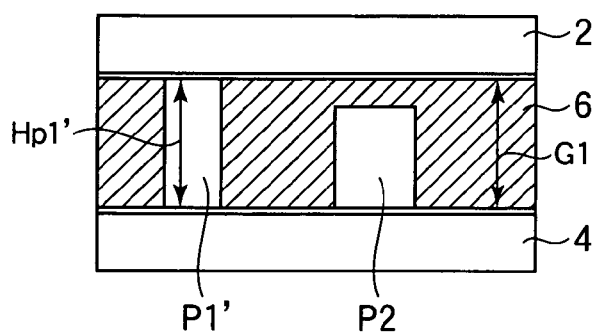

FIGS. 1A and 1B are sectional views schematically showing a method of manufacturing a liquid crystal display device according to the present implementation mode. In FIG. 1A, a state before the substrates are attached is shown and in FIG. 1B, a state after the substrates were attached is shown.

Firstly, a TFT substrate 2 provided with a TFT, a pixel electrode and a bus line and an opposite substrate 4 provided with a color filter (CF) and a common electrode are prepared. As shown in FIG. 1A, on the opposite substrate 4 for instance, two kinds of pillar structures (pillar spacers) P1 and P2 different in height are further formed. A height Hp1 of the structure P1 and a height Hp2 (<Hp1) of the structure P2 are designed so as to satisfy the relationship of $0.3\ \mu m \leq Hp1 - Hp2 \leq 1.0\ \mu m$.

In the next place, on the whole circumference of an outer periphery of the opposite substrate 4 or TFT substrate 2, in seamless manners, a sealing material (not shown in the drawing) is coated. Subsequently, on the opposite substrate 4 or TFT substrate 2, a predetermined dropping amount V of liquid crystal 6 is dropped. Here, in the ODF method, a cell gap G1 is determined according to the dropping amount V of liquid crystal. In the implementation mode, the dropping amount V of liquid crystal is controlled so that the cell gap G1, the height Hp1 of the structure P1 and the height Hp2 of the structure P2 shown in FIG. 1A may satisfy the relationship of $Hp2 < G1 < Hp1$, and the liquid crystal 6 is dropped from a dispenser by a controlled dropping amount V. In FIG. 1A, in order to illustrate the relationship between the height Hp1 of the structure P1, the height Hp2 of the structure P2 and the cell gap G1, the liquid crystal 6 not in a dropped state but in a filled state in a step described later is shown together.

Subsequently, as shown in FIG. 1B, the opposite substrate 4 and the TFT substrate 2 are attached in a vacuum followed by returning to atmospheric pressure, and thereby the liquid crystal 6 is filled. Thereby, the structure P1 shown in FIG. 1A is brought into contact with the TFT substrate 2 and compressed, and thereby resulting in a structure P1' having a height Hp1' (≦Hp1). The structure P2 does not come into contact with the TFT substrate 2; accordingly, the height Hp2 does not vary. Here, the cell gap G1, the height Hp1' of the structure P1' and the height Hp2 of the structure P2 satisfy the relationship of Hp1'≅G1>Hp2. The structure P1' always sustains the cell gap G1, and the structure P2, when a pressure is externally applied, sustains a cell gap G2 (not shown in the drawing) smaller than the cell gap G1. After passing through the above steps, a liquid crystal display device according to the present implementation mode comes to completion.

Figure 2:
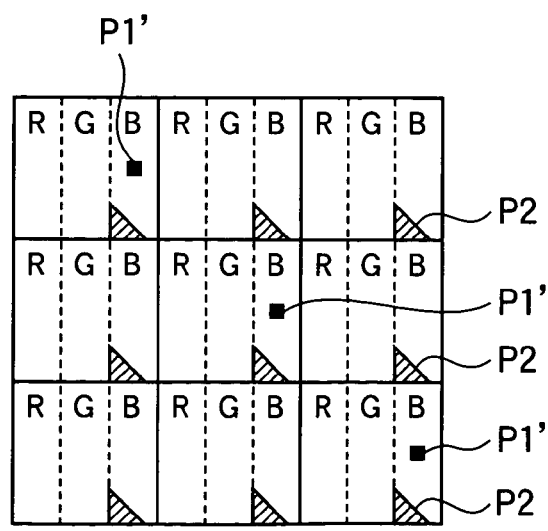
FIG. 2 is a diagram showing an arrangement of structures P1' and P2 of a liquid crystal display device according to one implementation mode of the invention.

In FIG. 2, an arrangement of the structures P1' and P2 of the liquid crystal display device according to the implementation mode is shown. In FIG. 2, 9 pixels in horizontal direction and 3 pixels in vertical direction, 27 pixels in total are shown. In each of the respective pixels, a CF layer of any one of R (red), G (green) and B (blue) is formed. As shown in FIG. 2, the structure P1' is formed in one-third the whole B pixels. That is, the structure P1' is formed by one (3 in FIG. 2) for 9 pixels. The structure P1' is placed in a substantial center portion of a pixel where a storage capacitor bus line and a storage capacitor electrode (both are not shown in the drawing) are disposed and has a square planar shape. When an area of the total 27 pixels shown in FIG. 2 is taken as S0 and an upper base area of the structure P1' is taken as S1, an area density D1 of the structure P1' becomes D1=(3×S1)/S0.

On the other hand, the structure P2, different from an arrangement pattern of the structure P1, is formed in the whole of B pixels. That is, the structure P2 is formed in one of three pixels (9 in FIG. 2). The structure P2 is placed at an end portion at the lower left of the pixel in the drawing and has a rectangular equilateral triangular planar shape. When an upper base area of the structure P2 is taken as S2, an area density D2 of the structure P2 is D2=(9×S2)/S0. In the implementation mode, the area density D1 of the structure P1' and the area density D2 of the structure P2 are designed so as to satisfy the relationship of D1≦D2. Thereby, until the structures P2 having the relatively large area density D2 come into contact with the TFT substrate 2, the structures P1 (P1') having the small area density D1 can flexibly conform to a change of the cell gap G1; accordingly, to the dispersion of the heights of the structures P1 and P2, panel design wide in the margin in the manufacture can be realized.

Figure 3A:
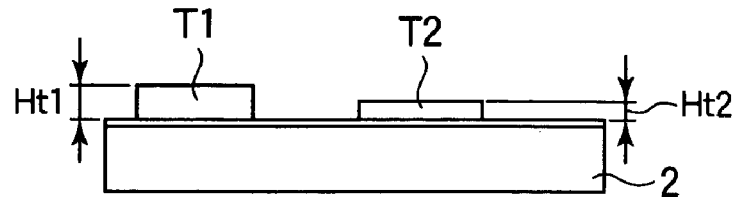
FIGS. 3A through 3C are sectional views schematically showing another example of the manufacturing method of a liquid crystal display device according to one implementation mode of the invention.
Figure 3B:
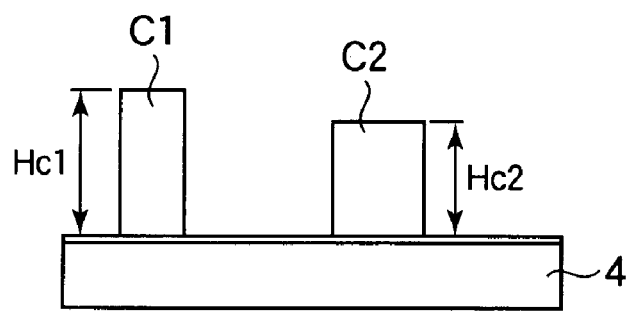
Figure 3C:
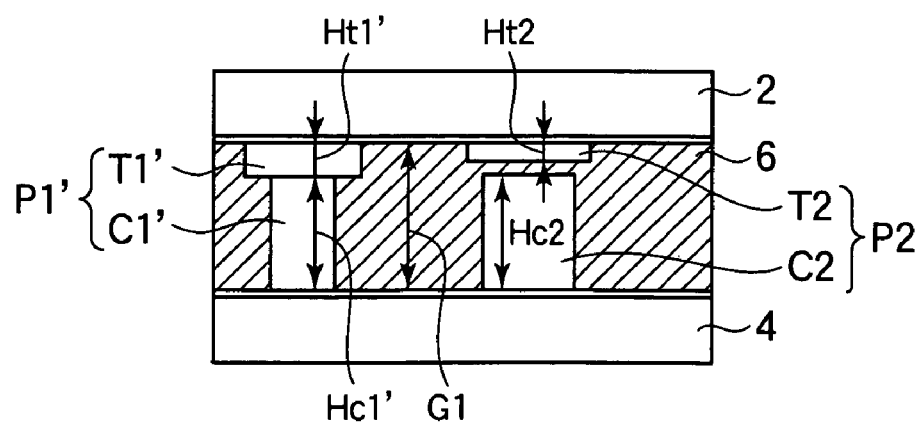

Furthermore, in the constitutions shown in FIGS. 1A and 1B, both of the structures P1 and P2 are formed on the opposite substrate 4; however, when considering the constitution of the TFT substrate 2 and the opposite substrate 4, other than the constitution shown in FIG. 1, various constitutions are possible. FIGS. 3A through 3C are sectional views showing another example of a liquid crystal display device according to the implementation mode and a manufacturing method thereof. In FIG. 3A, a constitution of the TFT substrate 2 before the attaching of the substrates is shown, and, in FIG. 3B, a constitution of the opposite substrate 4 before the attaching of the substrates is shown. In FIG. 3C, a constitution of a liquid crystal panel after the attaching of the substrates is shown.

Firstly, the TFT substrate 2 and the opposite substrate 4 are prepared. As shown in FIG. 3A, on the TFT substrate 2, for instance, two kinds of structures T1 and T2 that are different in height are formed. When the difference of the heights of the structures T1 and T2 is formed by the presence of a metal layer, a manufacturing process can be simplified and the accuracy of the difference of the heights can be made higher. Furthermore, as shown in FIG. 3B, on the opposite substrate 4, for instance, two kinds of structures C1 and C2 that are different in height are formed. The structure C1 is placed at a position that faces the structure T1 when both substrates 2 and 4 are attached, and the structure C2 is similarly placed at a position that faces the structure T2. The structures T1 and C1 constitute the structure P1, and the structures T2 and C2 constitute the structure P2. A height Hp1 of the structure P1 is a sum total of a height Ht1 of the structure T1 and a height Hc1 of the structure C1 (Hp1=Ht1+Hc1), and a height Hp2 of the structure P2 is a sum total of a height Ht2 of the structure T2 and a height Hc2 of the structure C2 (Hp2=Ht2+Hc2). The height Hp1 of the structure P1 and the Hp2 (<Hp1) of the structure P2 are designed so as to satisfy the relationship of 0.3 μm≦Hp1−Hp2≦1.0 μm.

In the next place, on the whole circumference of an outer periphery of the opposite substrate 4 or the TFT substrate 2, in seamless manners, a sealing material (not shown in the drawing) is coated. Subsequently, on the opposite substrate 4 or the TFT substrate 2, a predetermined dropping amount V of liquid crystal 6 is dropped. In the example, the dropping amount V of liquid crystal is controlled so that the cell gap G1, the height Ht1 of the structure T1, the height Hc1 of the structure C1, the height Ht2 of the structure T2 and the height Hc2 of the structure C2 may satisfy the relationship of Ht2+Hc2 (=Hp2)<G1<Ht1+Hc1 (=Hp1), and the controlled dropping amount V of liquid crystal 6 is dropped from a dispenser.

In the next place, as shown in FIG. 3C, the opposite substrate 4 and the TFT substrate 2 are attached in a vacuum followed by returning to an atmospheric pressure, and thereby the liquid crystal 6 is filled. Thereby, the structures T1 and C1 come into contact each other and are compressed between the substrates 2 and 4, and thereby the structure T1 becomes a structure T1' having a height Ht1' (≦Ht1), and the structure C1 becomes a structure C1' having a height Hc1' (≦Hc1). That is, the structure P1 that is constituted of the structures T1 and C1 becomes a structure P1' that is constituted of the structures T1' and C1' and has a height Hp1' (=Ht1'+Hc1'≦Hp1). On the other hand, the structures T2 and C2 do not come into contact each other; accordingly, a substantial height Hp2 (=Ht2+Hc2) of the structure P2 that is constituted of the structures T2 and C2 does not vary. Here, the cell gap G1, the height Ht1' of the structure T1', the height Hc1' of the structure C1', the height Ht2 of the structure T2 and the height Hc2 of the structure C2 satisfy the relationship of Ht1'+Hc1' (=Hp1')≅G1>Ht2+Hc2 (=Hp2). The structure P1' always sustains the cell gap G1 and the structure P2 sustains, when a pressure is externally applied, a cell gap G2 (not shown in the drawing) smaller than the cell gap G1.

In what follows, a liquid crystal display device according to the implementation mode and a method of manufacturing the same will be detailed with reference to embodiments.

Embodiment 1

Firstly, a liquid crystal display device according to embodiment 1 of the implementation mode and a method of manufacturing the same will be explained.

Figure 4:
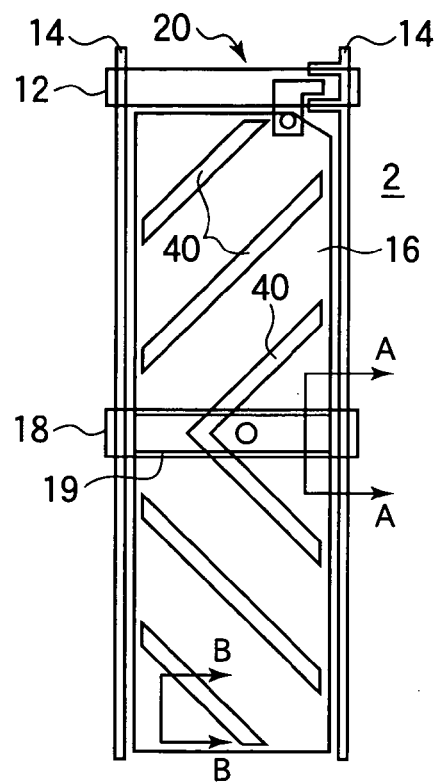
FIG. 4 is a diagram showing a constitution of a TFT substrate of a liquid crystal display device according to embodiment 1 of one implementation mode of the invention.
Figures 5A, 5B:
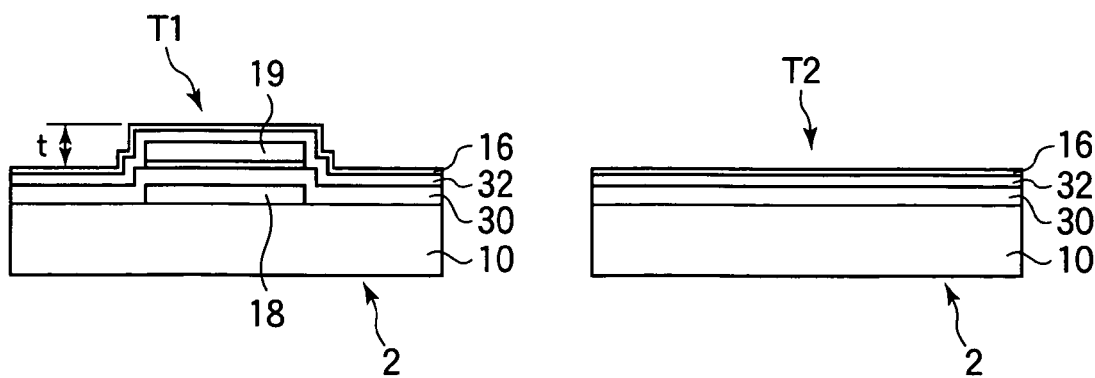
FIGS. 5A and 5B are diagrams showing sectional constitutions of a TFT substrate of a liquid crystal display device according to embodiment 1 of one implementation mode of the invention.

In FIG. 4, a constitution of one pixel of a TFT substrate 2 of a liquid crystal display device according to the present embodiment is shown. In FIG. 5A, a sectional constitution of the TFT substrate 2 cut along an A-A line in FIG. 4 is shown, and in FIG. 5B, a sectional constitution of the TFT substrate 2 cut along a B-B line in FIG. 4 is shown. As shown in FIGS. 4, 5A and 5B, on a glass substrate 10 of the TFT substrate 2, a gate bus line 12 extending in a horizontal direction in the drawing and a drain bus line 14 that intersects the gate bus line 12 through an insulating film 30 and extends in a vertical direction in the drawing are formed. In the neighborhood of a position where the gate bus line 12 and the drain bus line 14 intersect, a TFT 20 is formed. A pixel region is defined with the gate bus line 12 and the drain bus line 14. On the glass substrate 10, in parallel with the gate bus line 12, a storage capacitor bus line 18 that intersects the pixel region at a substantial center portion thereof is formed. On the storage capacitor bus line 18, a storage capacitor electrode (intermediate electrode) 19 that faces through an insulating film 30 the storage capacitor bus line 18 is formed for each of the pixel regions. Furthermore, in each of the pixel regions, a pixel electrode 16 is formed. In the pixel electrode 16, a plurality of slits (cutting out of the electrode) 40 that obliquely extends with respect to an end portion of the pixel region is formed. The slit 40 functions as an alignment control structure that controls alignment of a liquid crystal.

The TFT substrate 2 has the structures T1 and T2. The structure T1 is disposed in a substantial center portion of the pixel region and has a laminated structure of the storage capacitor bus line 18, the insulating film 30, the storage capacitor electrode 19, a protective film 32 and the pixel electrode 16 (FIG. 5A). The structure T2 is disposed at the lower left end portion of the pixel region in FIG. 4 and has a laminated structure of the insulating film 30, the protective film 32 and the pixel electrode 16 (FIG. 5B). The height Ht1 of the structure T1, in comparison with the height Ht2 of the structure T2 that does not have metal layers such as the storage capacitor bus line 18 and the storage capacitor electrode 19, is higher by a height t of the film thicknesses of the storage capacitor bus line 18 and the storage capacitor electrode 19 (Ht1>Ht2). In the embodiment, for convenience of easy understanding, the height Ht1 of the structure T1 is expressed with t, and the height Ht2 of the structure T2 is expressed as zero. The height Ht1 (=t) of the structure T1 is, for instance, 0.78 μm. The structure T1 is made of the same material as the storage capacitor bus line 18 and the storage capacitor electrode 19 and may have a metal layer separated from the storage capacitor bus line 18 and the storage capacitor electrode 19.

Figure 6:
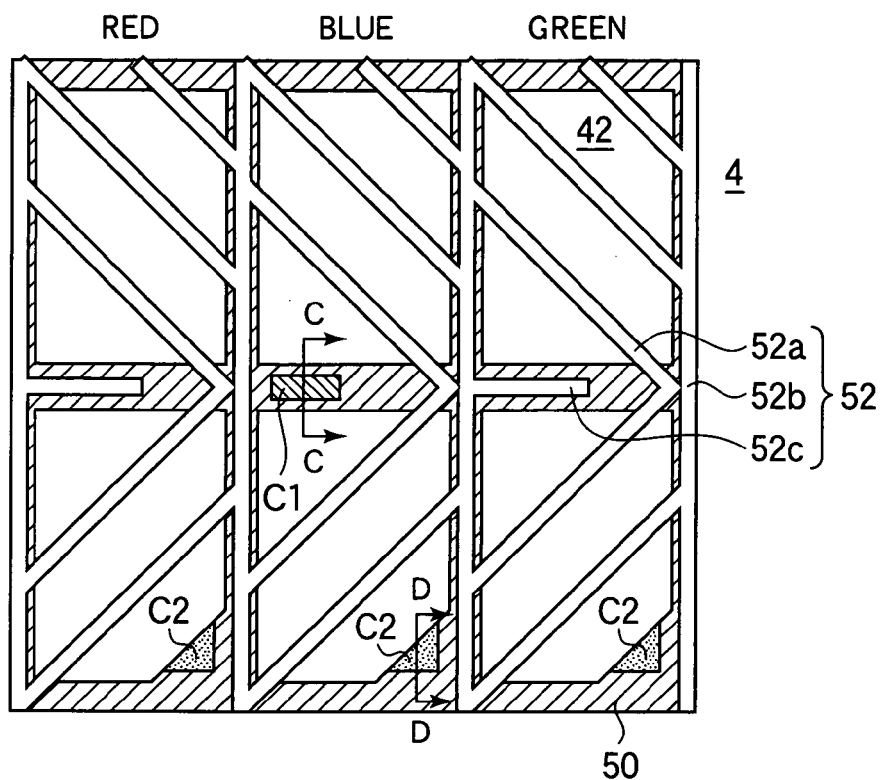
FIG. 6 is a diagram showing a constitution of an opposite substrate of a liquid crystal display device according to embodiment 1 of one implementation mode of the invention.
Figures 7A, 7B:
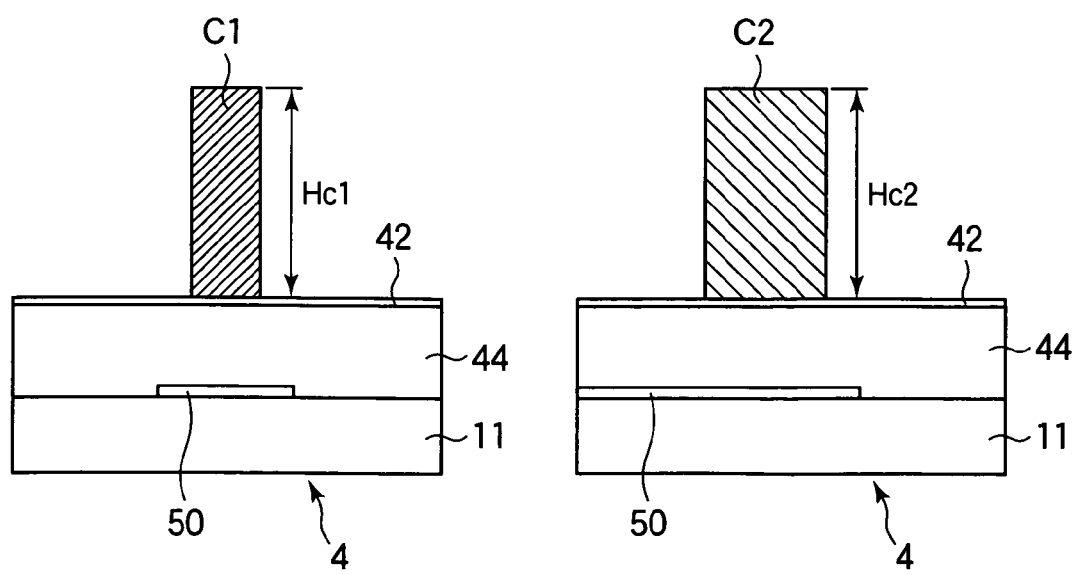
FIGS. 7A and 7B are diagrams showing sectional constitutions of an opposite substrate of a liquid crystal display device according to embodiment 1 of one implementation mode of the invention.

In FIG. 6, a constitution of three pixels of the opposite substrate 4 of the liquid crystal display device according to the embodiment is shown. In FIG. 7A, a sectional constitution of the opposite substrate 4 cut along a C-C line in FIG. 6 is shown, and in FIG. 7B, a sectional constitution of the opposite substrate 4 cut along a D-D line in FIG. 6 is shown. As shown in FIGS. 6, 7A and 7B, on a glass substrate 11 on the opposite substrate 4, a light shielding film (BM) 50 that defines the pixel region is formed from chromium (Cr) and so on. Furthermore, the BM 50 also shields the storage capacitor electrode 19 (and storage capacitor bus line 18) that is formed crossing the pixel region on the TFT substrate 2. In each of the pixel regions, a CF layer 44 of any one of R, G and B is formed. The CF layers 44 of R, G and B are formed into a substantially same thickness. On the whole substrate surface of each of the CF layers 44, a common electrode 42 is formed. On the common electrode 42, a linear protrusion 52 is formed. The protrusion 52 functions as an alignment control structure together with the slit 40 on the TFT substrate 2 side. The protrusion 52 includes a protrusion 52a that obliquely extends relative to the pixel region end portion, a protrusion 52b that is formed on the BM 50 and extends in a up and down direction in the drawing and a protrusion 52c that extends along the storage capacitor bus line 18 on the TFT substrate 2 side.

Among the whole B pixels, in one third thereof, the structure C1 is formed of, for instance, a photosensitive resin. The structure C1 is disposed on a position corresponding to the storage capacitor bus line 18 on the TFT substrate 2 side. In the B pixel wherein the structure C1 is formed, the protrusion 52c is not formed. Furthermore, at the lower right end portions of the whole pixels of R, G and B in FIG. 6, the structures C2 are formed. The structures C1 and C2 are formed according to, for instance, the same manufacturing process from the same formation material. The height Hc1 of the structure C1 from the common electrode 42 and the height Hc2 of the structure C2 from the common electrode 42 are, for instance, 3.8 μm, the substantially same each other (Hc1≅Hc2). An upper base area S1 of the structure C1 is 300 μm$^2$ and an upper base area S2 of the structure C2 is 600 μm$^2$(S1≦S2). Furthermore, the structure C1 is disposed one for 9 pixels and the area density D1 of the structure C1 is 0.04%. The structure C2 is disposed one for one pixel and the area density D2 of the structure C2 is 0.72% (D1≦D2).

When both substrates 2 and 4 are attached, the structure C1 faces the structure T1 that includes the storage capacitor bus line 18 and the storage capacitor electrode 19, and the structure C2 faces the structure T2 in a pixel opening. The height Hp1 of the structure P1 that is constituted of the structures T1 and C1 is Hp1=Ht1+Hc1=4.58 (μm), and the height Hp2 of the structure P2 that is constituted of the structures T2 and C2 is Hp2=Ht2+Hc2=3.8 (μm). The respective heights Hp1 and Hp2 of the structures P1 and P2 satisfy the relationship of 0.3 (μm)≦Hp1−Hp2 (=0.78 (μm)) ≦1.0 (μm).

Figure 8A:
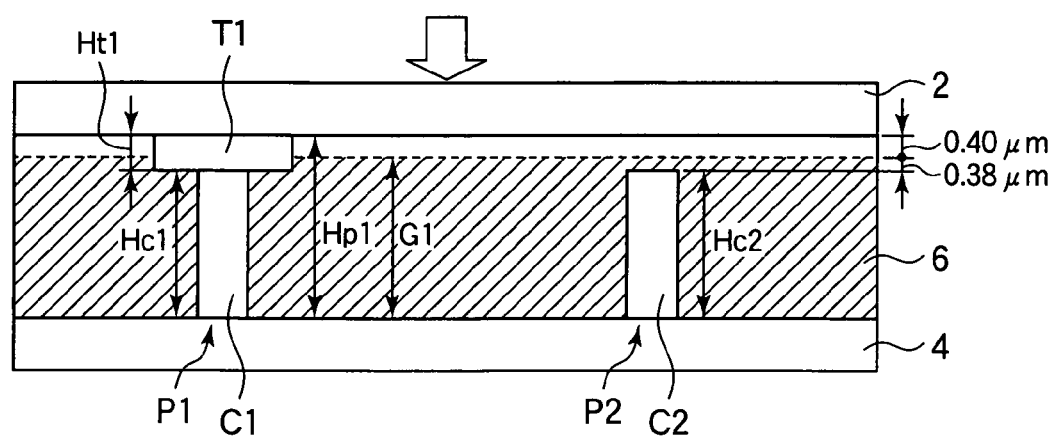
FIGS. 8A and 8B are diagrams showing a manufacturing method of a liquid crystal display device according to embodiment 1 of one implementation mode of the invention.
Figure 8B:
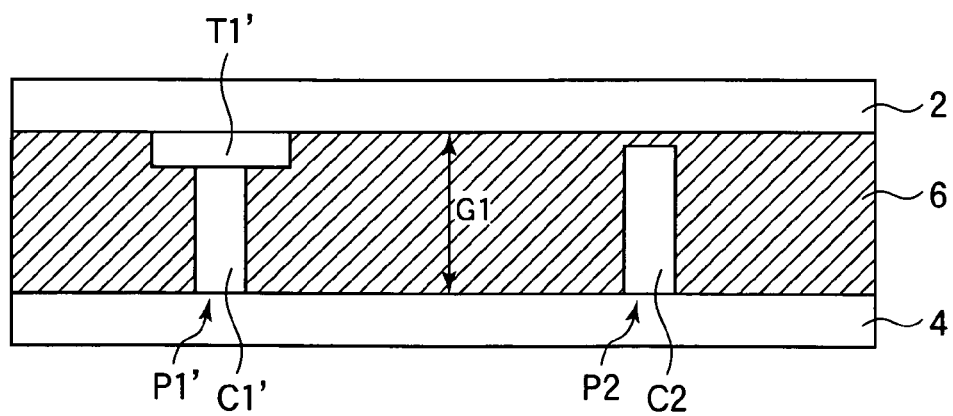

FIGS. 8A and 8B are sectional views schematically showing a manufacturing method of a liquid crystal display device according to the embodiment. In FIG. 8A, a state before the substrates are attached is shown, and in FIG. 8B, a state after the substrates were attached is shown. Firstly, on the whole circumference of an outer periphery of the TFT substrate 2 or the opposite substrate 4 shown in FIGS. 4 through 7, in seamless manners, a sealing material (not shown in the drawing) is coated. Subsequently, on the TFT substrate 2 or the opposite substrate 4, a predetermined dropping amount V of liquid crystal 6 is dropped. As shown in FIG. 8A, in the embodiment, the dropping amount V of liquid crystal is controlled so that the cell gap G1, the height Hp1 of the structure P1 that is constituted of the structures T1 and C1 and the height Hp2 of the structure P2 that is constituted of the structures T2 and C2 may satisfy the relationship of Hp2<G1<Hp1, and the controlled dropping amount V of liquid crystal 6 is dropped from a dispenser. Hp1=G1+0.40 (μm) and G1=Hp2+0.38 (μm). In FIG. 8A, in order to illustrate the relationship between the height Hp1 of the structure P1, the height Hp2 of the structure P2 and the cell gap G1, the liquid crystal 6 not in a dropped state but in a filled state in a step described later is shown together. Furthermore, as mentioned above, the height Ht1 of the structure T1 is set at t (=0.78 (μm)) and the height Ht2 of the structure T2 is set at zero; accordingly, the structure T2 is not shown in the drawing.

In the next place, as shown in FIG. 8B, the opposite substrate 4 and the TFT substrate 2 are attached in a vacuum followed by returning to an atmospheric pressure, and thereby the liquid crystal 6 is filled. Thereby, the structure P1 that is constituted of the structures T1 and C1 are compressed by 0.40 μm between the substrates 2 and 4, resulting in the structure P1' constituted of the structures T1' and C1'. The structure P2 (C2) does not come into contact with the TFT substrate 2; accordingly, the height Hp2 does not vary.

Through the above steps, a liquid crystal display device according to the embodiment comes to completion.

Figure 9A:
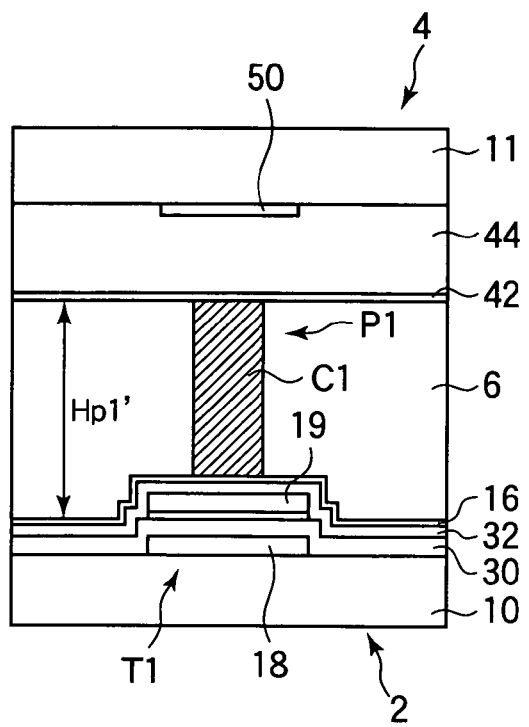
FIGS. 9A and 9B are diagrams showing sectional constitutions of a liquid crystal display device according to embodiment 1 of one implementation mode of the invention.
Figure 9B:
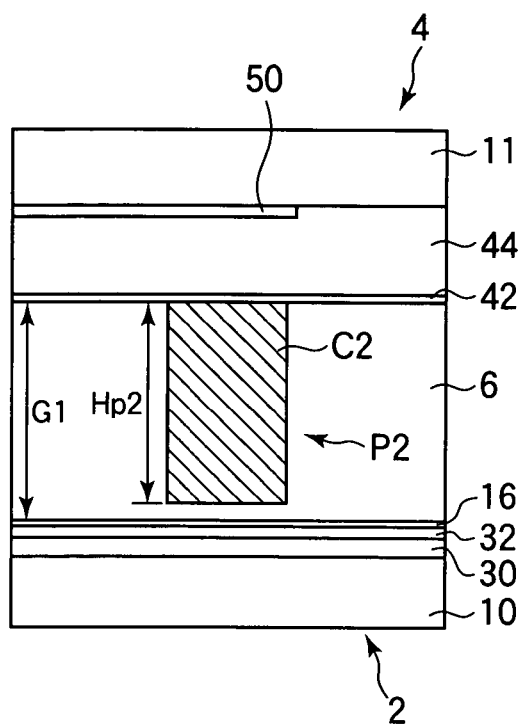

In FIGS. 9A and 9B, sectional constitutions of the liquid crystal display device according to the embodiment are shown. In FIG. 9A, a sectional constitution in the neighborhood of the structure P1 is shown, and in FIG. 9B, a sectional constitution in the neighborhood of the structure P2 is shown. As shown in FIGS. 9A, 9B and 8B mentioned above, the cell gap G1, the height Hp1' of the structure P1' and the height Hp2 of the structure P2 satisfy the relationship of Hp1'≅G1>Hp2. The structure P1' is compressed by 0.40 μm between the substrates 2 and 4. Furthermore, there is a gap of 0.38 μm between the structure P2 and the TFT substrate 2; accordingly, these do not come into contact. The structure P1' always sustains the cell gap G1, and the structure P2 sustains, upon application of an external pressure, the cell gap G2 (not shown in the drawing) smaller than G1.

In the case of the height Hp1 of the structure P1 being formed lower by 0.2 μm in the height owing to the dispersion in the manufacture, the structure P1' after the attaching of the substrates is compressed by 0.2 μm. Accordingly, a prepared liquid crystal panel has an internal pressure that does not cause the gravity unevenness.

On the other hand, even in the case of the height Hp2 of the structure P2 being formed higher by 0.2 μm in the height, there is a gap of 0.18 μm between the structure P2 and the TFT substrate 2 after the attaching thereof; accordingly, these do not come into contact at normal temperatures. Accordingly, bubbles are inhibited from occurring at low temperatures.

Furthermore, when a local pressure is applied on a liquid crystal panel, the structure P1 as well as the structure P2 sustains the cell gap. At this time, a sum total of the area densities of the structures P1 and P2, D1+D2, is 0.76%. Accordingly, the cell gap unevenness is not caused and high resistance against the local pressurization can be obtained.

Thus, according to the embodiment, when a pressure is not externally applied, only the structure P1 low in the area density D1 (=0.04%) sustains the cell gap; accordingly, foaming under low temperatures can be inhibited from occurring. Furthermore, when a pressure is externally applied, the structures P1 and P2 high in the area density D1+D2 (=0.76%) sustain the cell gap. Accordingly, the cell gaps can be inhibited from becoming uneven. Still furthermore, according to the embodiment, in the manufacturing process of the liquid crystal display device in which process the ODF method is applied, two conflicting effects, a wide margin in the manufacture and high compression resistance, can be simultaneously realized.

Embodiment 2

In the next place, a liquid crystal display device according to embodiment 2 of the present implementation mode and a method of manufacturing the same will be explained.

Figure 10:
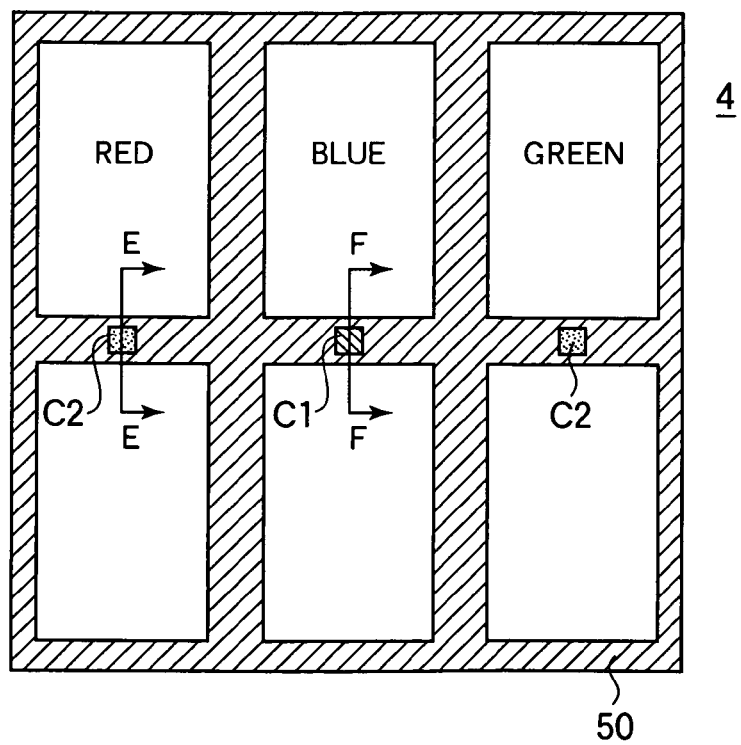
FIG. 10 is a diagram showing a constitution of an opposite substrate of a liquid crystal display device according to embodiment 2 of one implementation mode of the invention.
Figures 11A, 11B:
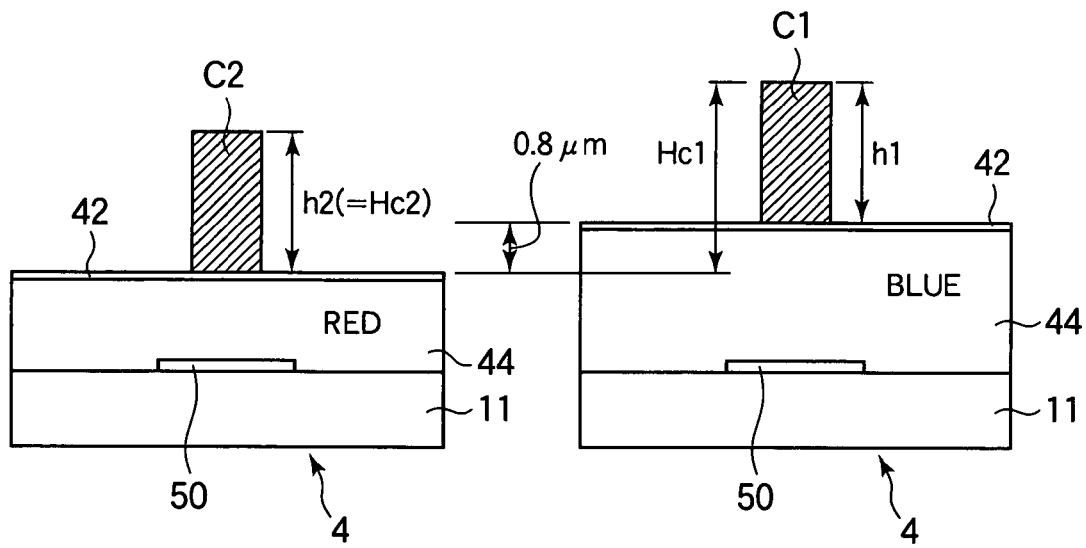
FIGS. 11A and 11B are diagrams showing sectional constitutions of an opposite substrate of a liquid crystal display device according to embodiment 2 of one implementation mode of the invention.

In FIG. 10, a constitution of three pixels of an opposite substrate 4 of a liquid crystal display device according to the embodiment is shown. In FIG. 11A, a sectional constitution of the opposite substrate 4 cut along an E-E line in FIG. 10 is shown and in FIG. 1B, a sectional constitution of the opposite substrate 4 cut along a F-F line in FIG. 10 is shown. As shown in FIGS. 10, 11A and 11B, film thicknesses of CF layers 44 of the opposite substrate 4 are different in the respective pixels of R, G and B. Thereby, a liquid crystal display device manufactured by use of the opposite substrate 4 has a multi-gapped structure in which cell gaps are different for the respective pixels of R, G and B. In the embodiment, film thicknesses of the CF layers 44 of R and G are 1.8 μm, and a film thickness of the CF layer 44 of B is 2.6 μm thicker by 0.8 μm than the film thicknesses of the CF layers 44 of R and G.

On a BM 50 in a region that shields light from a storage capacitor electrode 19 and so on formed on a TFT substrate 2 side, structures C1 and C2 are formed. A height h2 of the structures C2 formed on the pixels of R and G is 2.7 μm. The structure C1 formed on the B pixel becomes lower than the structure C2 owing to leveling, and a height h1 thereof is 2.6 μm. Here, since the CF layer 44 of B is thicker by 0.8 μm than the CF layers 44 of R and G, a substantial height Hc1 of the structure C1 becomes 3.4 μm. A substantial height Hc2 (=h2) of the structure C2 is 2.7 μm.

A constitution of the TFT substrate 2, being the same as that shown in FIG. 5, is omitted from explaining here; however, in regions corresponding to the structures P1 and P2, structures T1 and T2 having a height t=0.78 μm(=Ht1=Ht2) are respectively formed. A height Hp1 of a structure P1 that is constituted of the structures T1 and C1 is Hp1=Ht1+Hc1=4.18 (μm), and a height Hp2 of a structure P2 that is constituted of the structures T2 and C2 is Hp2=Ht2+Hc2=3.48 (μm). The respective heights Hp1 and Hp2 of the structures P1 and P2 satisfy the relationship of 0.3 (μm)≦Hp1−Hp2 (=0.70 (μm))≦1.0 (μm).

Figure 12A:
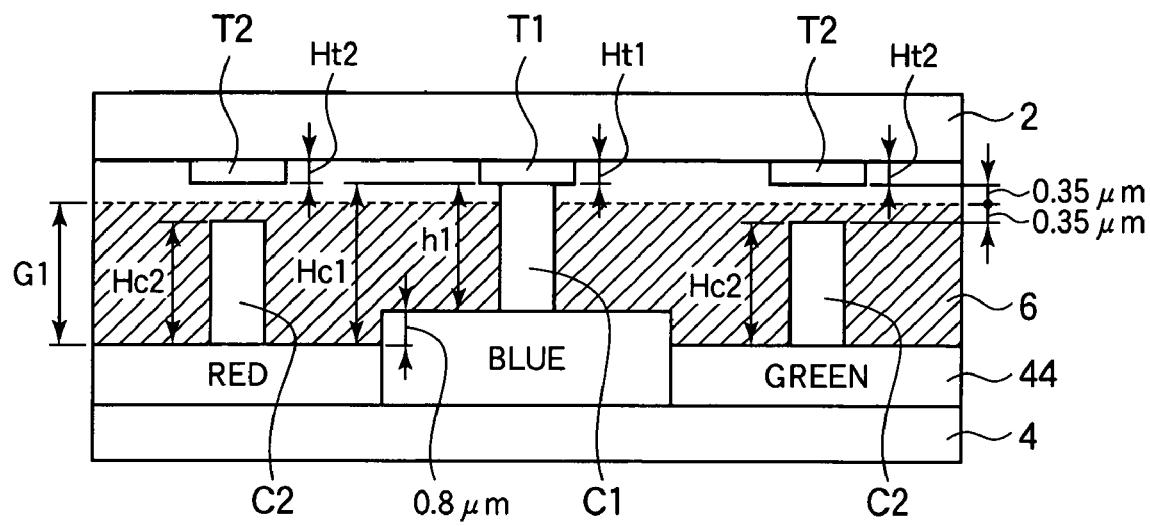
FIGS. 12A and 12B are diagrams showing a manufacturing method of a liquid crystal display device according to embodiment 2 of one implementation mode of the invention.
Figure 12B:
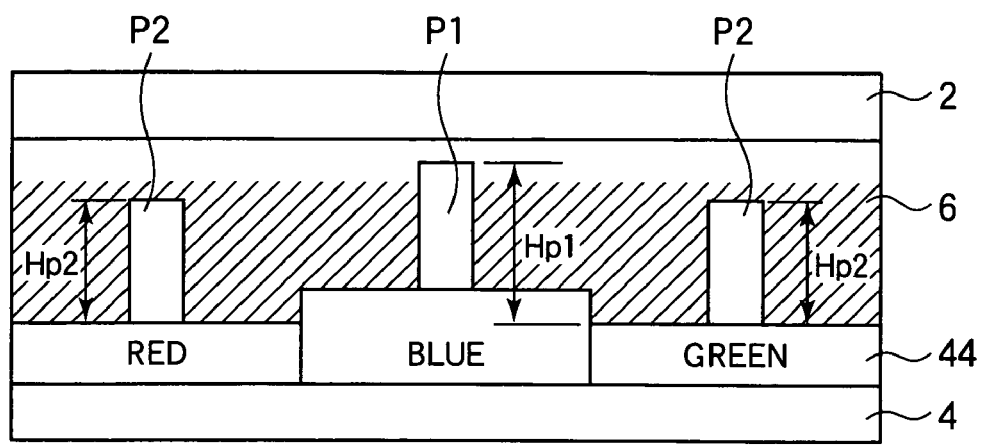

In FIGS. 12A and 12B, sectional views schematically showing a method of manufacturing the liquid crystal display device according to the embodiment are shown. In FIG. 12A, a state before the attaching of the substrates is shown and in FIG. 12B, an equivalent diagram in which the state shown in FIG. 12A is expressed with steps of the structures P1, P2 and the CF layers 44. As shown in FIGS. 12A and 12B, in the embodiment, a dropping amount V of liquid crystal is controlled so that a cell gap G1, the height Hp1 of the structure P1 that is constituted of the structures T1 and C1 and the height Hp2 of the structure P2 that is constituted of the structures T2 and C2 may satisfy the relationship of Hp2<G1<Hp1, and a liquid crystal 6 is dropped from a dispenser by a controlled dropping amount V of liquid crystal.

In FIGS. 13A and 13B, sectional constitutions of the liquid crystal display device according to the embodiment are shown. In FIG. 13A, a sectional constitution in the neighborhood of the structure P2 is shown and in FIG. 13B, a sectional constitution in the neighborhood of a structure P1' is shown. As shown in FIGS. 13A and 13B, at normal times, the structure P1' formed on the B pixel sustains the cell gap G1 of the R pixel.

In FIG. 14, an arrangement of the structures P1' and P2 is shown. In FIG. 14, 6 pixels in a horizontal direction, 3 pixels in a vertical direction, 18 pixels in total are shown. As shown in FIG. 14, the structure P1' is formed in one sixth of the B pixels. That is, one structure P1' is formed for 18 pixels. An upper base area S1 of the structure P1' is 300 μm², and an area density D1 is 0.05%. On the other hand, the structure P2 is formed in all pixels of R and G. That is, the structure P2 is formed in 12 of 18 pixels. An upper base area S2 of the structure P2 is 300 μm² (=S1), and an area density D2 is 0.6% (>D1).

In the embodiment, the wide margin in the manufacture can be obtained in the manufacturing process of the liquid crystal display device where the ODF method is applied, and since when a pressure is not externally applied, only the structure P1' low in the area density D1 (=0.05%) sustains the cell gap G1, bubbles can be inhibited from occurring at low temperatures. Furthermore, when a pressure is externally applied, the structures P1' and P2 high in the area density D1+D2 (=0.65%=13×D1) sustain the cell gap G2; accordingly, unevenness in the cell gap can be suppressed from occurring.

Figure 15:
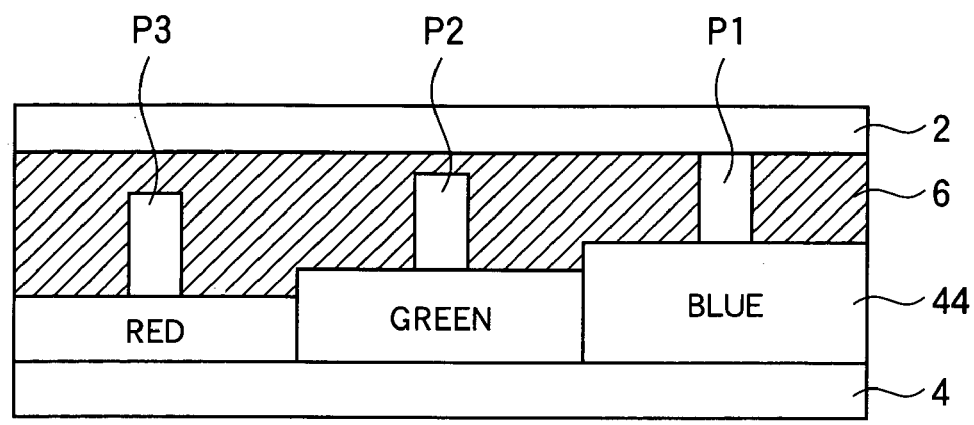
FIG. 15 is a diagram showing a sectional constitution of a liquid crystal display device according to a modification example of embodiment 2 according to one implementation mode of the invention.

In the embodiment, film thicknesses of the CF layers 44 of the R and G pixels are made the same; however, the film thickness of the CF layer 44 may be differentiated between the R pixel and the G pixel. In FIG. 15, a sectional constitution of a liquid crystal display device in which all of the film thicknesses of the CF layers 44 of the respective pixels of R, G and B are differentiated is shown. As shown in FIG. 15, in the liquid crystal display device having a multi-gapped structure, in the film thicknesses of the CF layers 44, one for the B pixel is the thickest followed by one for the G pixel and further followed by one for the R pixel in a decreasing order. Accordingly, the liquid crystal display device has a structure P1 that is formed on a B pixel and always sustains a cell gap; a structure P2 that is formed on a G pixel and lower than the structure P1; and a structure P3 that is formed on a R pixel and lower than the structure P2. In the constitution too, when a dropping amount of liquid crystal is controlled, same effects as the above can be obtained.

Embodiment 3

Figure 16:
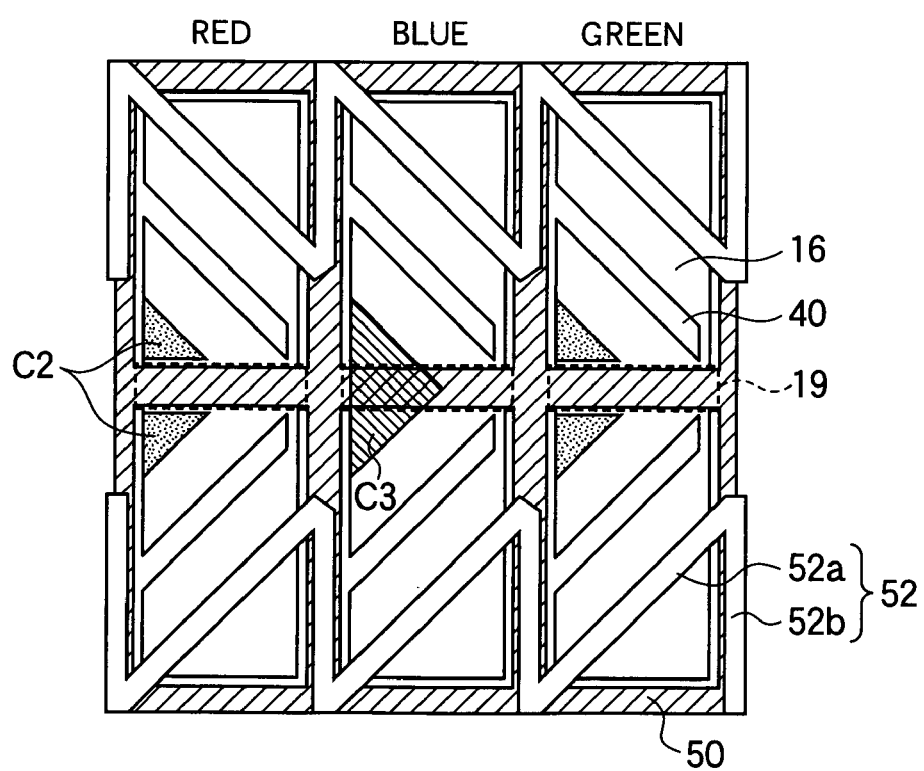
FIG. 16 is a diagram showing a constitution of a liquid crystal display device according to embodiment 3 of one implementation mode of the invention.

In the next place, a liquid crystal display device according to embodiment 3 of the implementation mode will be explained. In FIG. 16, a constitution for three pixels of the liquid crystal display device according to the embodiment is shown. As shown in FIG. 16, in each of openings of R and G pixels in a BM 50, two structures C2 are disposed with a BM 50 in a region that shields light from a storage capacitor electrode 19 and so on interposed therebetween. The structure C2 has a rectangular equilateral triangular planar shape and two sides in a right angle substantially coincide with end sides of the BM 50. Furthermore, a hypotenuse thereof runs substantially in parallel with a protrusion 52a and slit 40 that are alignment control structures. In the B pixel, one structure C3 that straddles the BM 50 in a region that shields light from the storage capacitor electrode 19 and so on is disposed. The structure C3 has a rectangular equilateral triangular planar shape and two sides in a right angle extend substantially in parallel with the protrusion 52a and slit 40. The structures C2 and C3 on the opposite substrate 4 are manufactured according to the same manufacturing process and into the same height. Furthermore, the structures C2 and C3 have a function as an alignment control structure that controls alignment of a liquid crystal.

Figure 17:
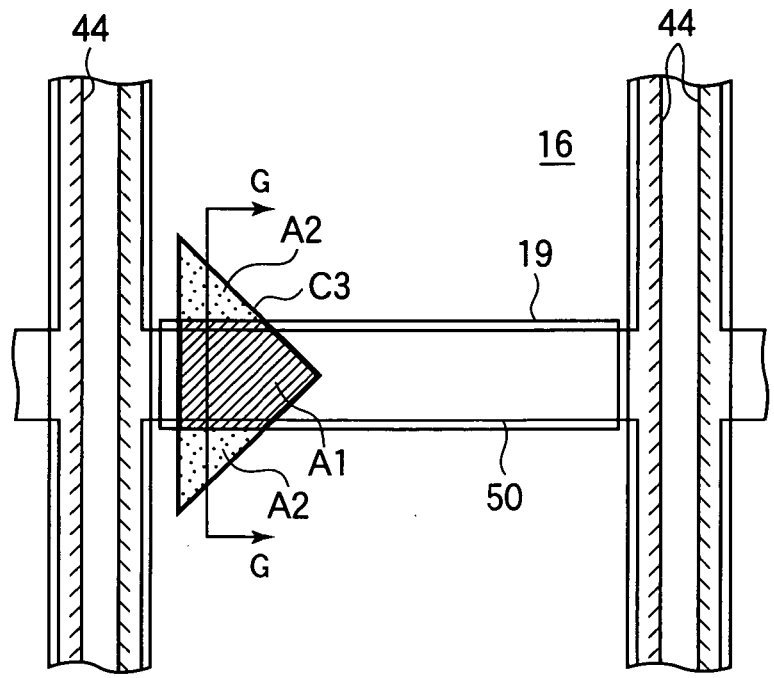
FIG. 17 is a diagram showing a constitution in the neighborhood of a structure C3 of a liquid crystal display device according to embodiment 3 of one implementation mode of the invention.
Figure 18:
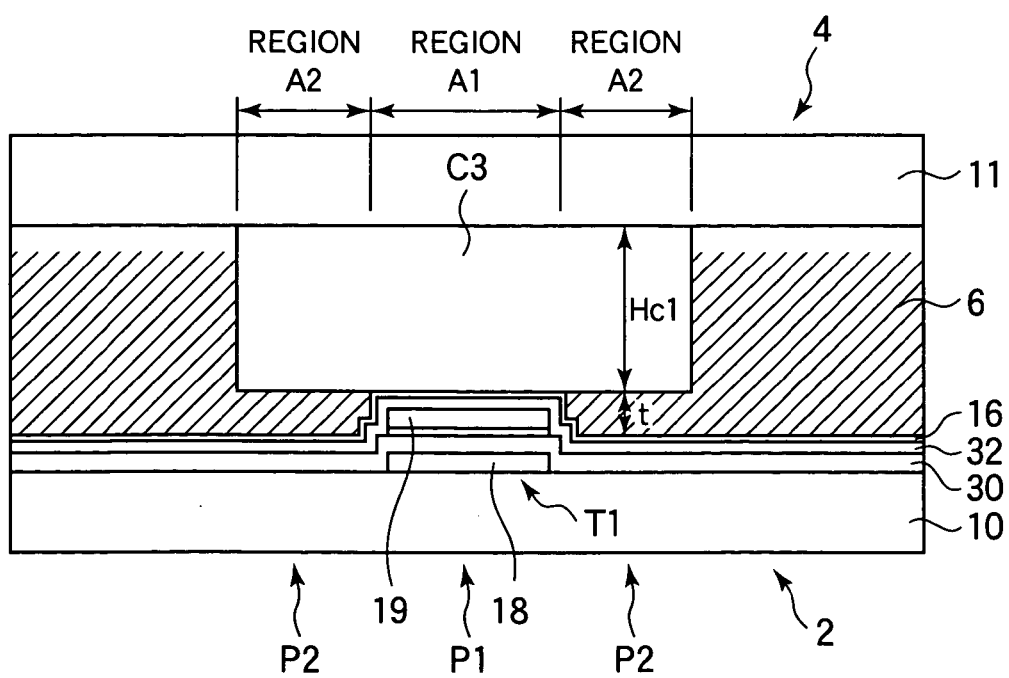
FIG. 18 is a diagram showing a sectional constitution in the neighborhood of a structure C3 of a liquid crystal display device according to embodiment 3 of one implementation mode of the invention.

In FIG. 17, a constitution in the neighborhood of the structure C3, and, in FIG. 18, a constitution of the liquid crystal display device cut along a G-G line in FIG. 17 is shown. As shown in FIGS. 17 and 18, the structure C3 is divided into a region A1 that overlaps the storage capacitor electrode 19 and regions A2 that do not overlap the storage capacitor electrode 19. Similarly to the embodiment 1, a region where the storage capacitor electrode 19 is formed of the TFT substrate 2 is formed into a structure T1 that is higher in the height by t (=0.78 μm) than other regions. Accordingly, the structure C3 in the region A1 constitutes, together with the structure T1, the structure P1 and the structure P1 (P1') sustains the cell gap G1. On the other hand, the structure C3 and the structure C2 in the regions A2 are equivalent in the contribution to the cell gap and constitute, without coming into contact with the TFT substrate 2, structures P2 lower than the structure P1, respectively. The structures P2 sustain the cell gap G2 that is narrower than the cell gap G1.

In the embodiment, the wide margin in the manufacture can be obtained in the manufacturing process of the liquid crystal display device where the ODF method is applied, and since when a pressure is not externally applied, only the structure P1 low in the area density sustains the cell gap, bubbles can be inhibited from occurring at low temperatures. Furthermore, when a pressure is externally applied, the structure P1 is compressed, the structures C3 and C2 in the regions A2 are brought into contact with the TFT substrate 2, and the structures P1 and P2 higher in the area density sustain the cell gap G2; accordingly, unevenness in the cell gap can be suppressed from occurring. Furthermore, since the structures C2 and C3 that constitute the structures P1 and P2 have a function as an alignment control structure, a region of wrongly aligned liquid crystal can be inhibited from occurring; accordingly, a liquid crystal display device that does not exhibit display defect and does not cause a decrease in the transmittance can be obtained.

Embodiment 4

Figure 19:
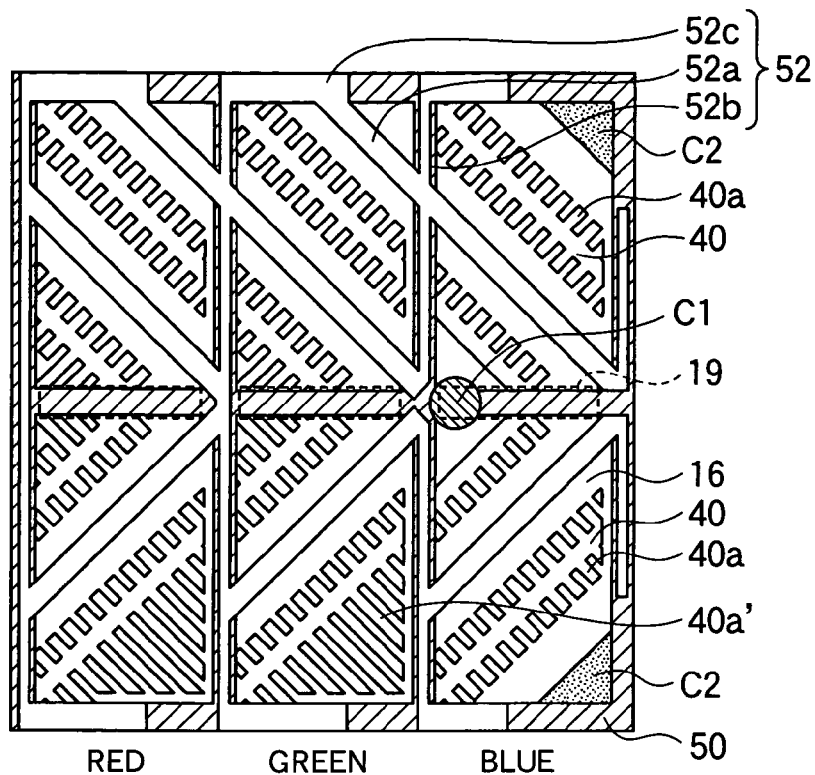
FIG. 19 is a diagram showing a constitution of a liquid crystal display device according to embodiment 4 of one implementation mode of the invention.

In the next place, a liquid crystal display device according to embodiment 4 of the implementation mode will be explained. In FIG. 19, a constitution for three pixels of the liquid crystal display device according to the embodiment is shown. As shown in FIG. 19, a structure C1 disposed in a B pixel is formed on an opposite substrate 4 in a position that overlaps a storage capacitor electrode 19. The structure C1 has a circular planar shape. Structures C2 disposed similarly in the B pixel are disposed at the upper right and lower right end portions of the pixel region in the drawing. The structure C2 has a rectangular equilateral triangular planar shape and two sides in a right angle substantially coincide with end sides of a BM 50. Furthermore, a hypotenuse extends substantially in parallel with a protrusion 52a and a slit 40 that are alignment control structures. The structures C1 and C2 are formed according to the same manufacturing process into the same height. The structures C1 and C2 have also a function as an alignment control structure. Accordingly, in the neighborhoods of the structures C1 and C2, a formation pattern of the alignment control structure is different from that in other regions. In a constitution according to, for instance, the embodiment, the slit 40 has fine slits 40a that extend substantially perpendicularly to an extending direction thereof; however, the slit 40 in the neighborhood of the structure C1 does not have the fine slit 40a. Furthermore, as shown above the respective pixels, in the neighborhood of the structure C2 of the B pixel, different from the pixels of R and G, a protrusion 52 is not formed. Still furthermore, as shown below the respective pixels, in the pixels of R and G where the structure C2 is not formed, fine slits 40a longer in the length than those in other region are formed. Thus, when the formation patterns of the protrusions 52 and the slits 40 are optimized corresponding to the presence of the structures C1 and C2 that function as alignment control structures, stable liquid crystal alignment can be obtained.

Similarly to the embodiment 1, a region where the storage capacitor electrode 19 of the TFT substrate 2 is formed into a structure T1 that is higher by t (=0.78 μm) than other regions. Accordingly, the structure C1, together with the structure T1, constitutes a structure P1 and the structure C2 constitutes a structure P2 that is lower than the structure P1. The structure P1 (P1') sustains the cell gap G1 and the structure P2 sustains the cell gap G2 narrower than the cell gap G1.

Figure 20:
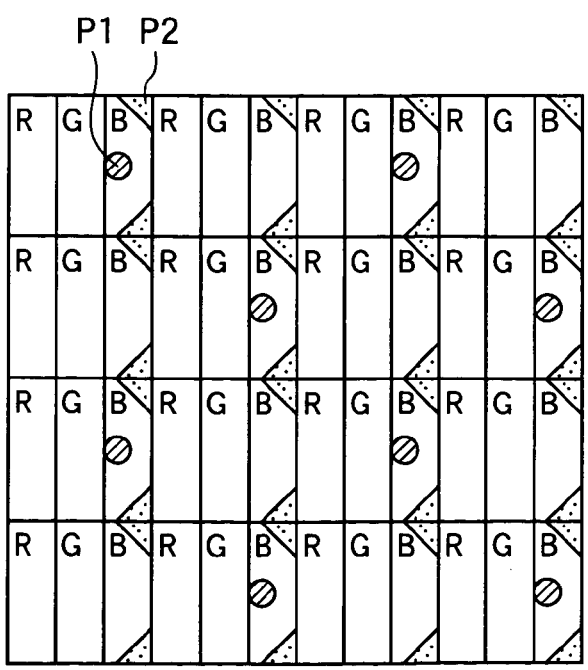
FIG. 20 is a diagram showing an arrangement of structures P1 and P2 of a liquid crystal display device according to embodiment 4 of one implementation mode of the invention.

In FIG. 20, an arrangement of the structures P1 and P2 is shown. In FIG. 20, 12 pixels in a horizontal direction, 4 pixels in a vertical direction, and 48 pixels in total are shown. As shown in FIG. 20, the structure P1 is formed in one half the B pixels. That is, one structure P1 is formed for 6 pixels. On the other hand, two structures P2 are formed for all B pixels. That is, four structures P2 are formed for six pixels. An upper base area S1 of the structure P1 and an upper base area S2 of the structure P2 satisfy the relationship of $S1 \leq S2$, and an area density D1 of the structure P1 and an area density D2 of structure P2 satisfy the relationship of $D1 \leq D2$.

In the embodiment, the wide margin in the manufacture can be obtained in the manufacturing process of the liquid crystal display device where the ODF method is applied, and since when a pressure is not externally applied, only the structure P1 that is low in the area density sustains the cell gap, bubbles can be inhibited from occurring at low temperatures. Furthermore, when a pressure is externally applied, the structure P1 is compressed, the structures C3 and C2 in the regions A2 are brought into contact with the TFT substrate 2, and thereby the structures P1 and P2 higher in the area density sustain the cell gap G2; accordingly, unevenness in the cell gap can be suppressed from occurring. Still furthermore, since the structures C2 and C3 that constitute the structures P1 and P2 have a function as an alignment control structure, a region of wrongly aligned liquid crystal can be inhibited from occurring; accordingly, a liquid crystal display device that does not exhibit display defect and does not cause a decrease in the transmittance can be obtained.

Embodiment 5

Figure 21:
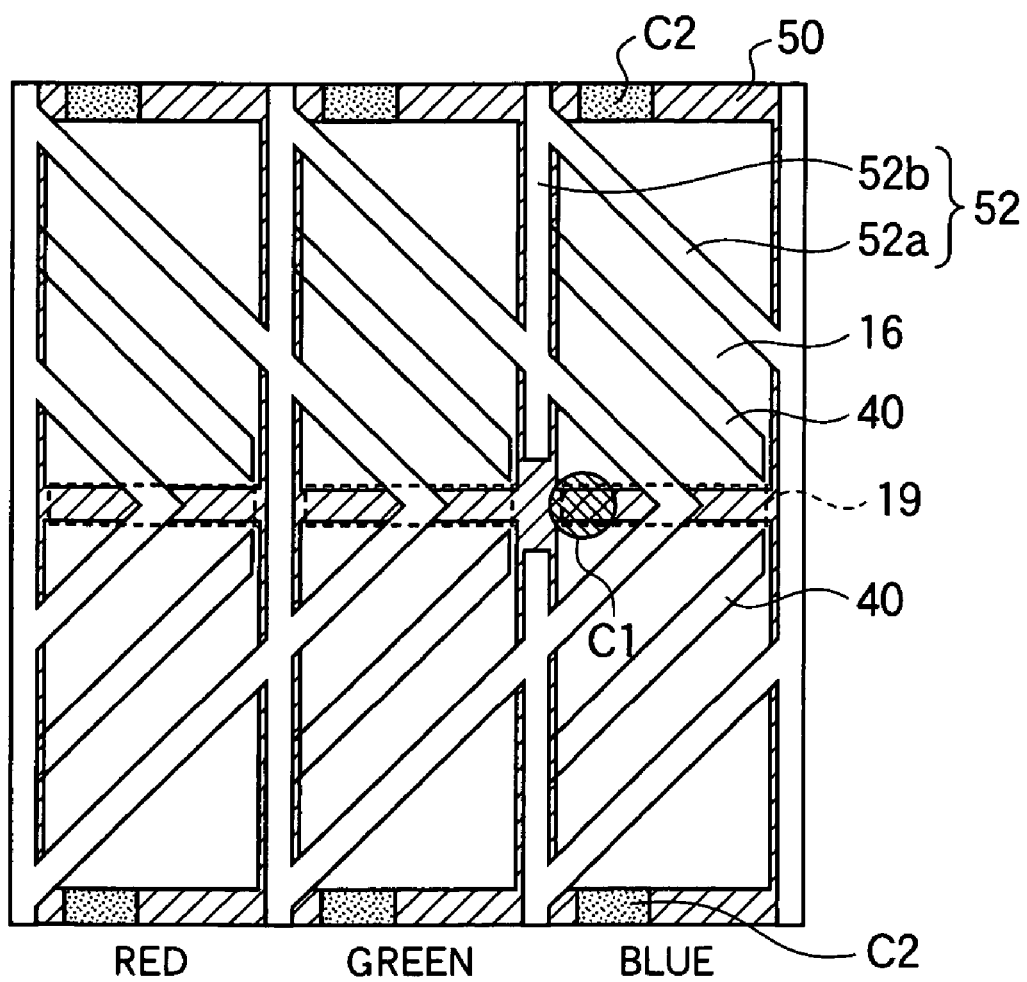
FIG. 21 is a diagram showing a constitution of a liquid crystal display device according to embodiment 5 of one implementation mode of the invention.

Next, a liquid crystal display device according to embodiment 5 of the implementation mode will be explained. In FIG. 21, a constitution for three pixels of the liquid crystal display device according to the embodiment is shown. As shown in FIG. 21, a structure C1 disposed in a B pixel is formed on an opposite substrate 4 in a position that overlaps a storage capacitor electrode 19. The structure C1 has a circular planar shape. The structure C2 is disposed at a position that is an end portion of each of R, G and B pixels and overlaps a gate bus line 12 (not shown in the drawing). The structure C2 has a rectangular planar shape. The structures C1 and C2 are formed according to the same manufacturing process with the same height. The structures C1 and C2 have also a function as an alignment control structure. Accordingly, in the neighborhoods of the structures C1 and C2, the formation patterns of the alignment control structures are different from those in other regions. For instance, in the neighborhood of the structure C1, a protrusion 52b is not formed. Thus, when the formation patterns of the protrusion 52 and the slit 40 are optimized corresponding to the presence of the structures C1 and C2 that function as alignment control structures, stable liquid crystal alignment can be obtained.

When considering steps on a surface of the TFT substrate 2, a region where the storage capacitor electrode 19 and the storage capacitor bus line 18 are formed is formed into a structure T1 that is higher by 0.5 μm than a region where the gate bus line 12 is formed. Accordingly, the structure C1, together with the structure T1, constitutes the structure P1, and the structure C2 constitutes the structure P2 lower than the structure P1. The structure P1 (P1') sustains the cell gap G1 and the structure P2 sustains the cell gap G2 that is narrower than the cell gap G1. An upper base area S1 of the structure P1 and an upper base area S2 of the structure P2 satisfy the relationship of $S1 \leq S2$, and an area density D1 of the structure P1 and an area density D2 of structure P2 satisfy the relationship of $D1 \leq D2$.

In the embodiment, a wide margin in the manufacture can be obtained in the manufacturing process of the liquid crystal display device where the ODF method is applied, and since when a pressure is not externally applied, only the structure P1 that is low in the area density sustains the cell gap, bubbles can be inhibited from occurring at low temperatures. Furthermore, when a pressure is externally applied, the structure P1 is compressed, the structures C3 and C2 in the regions A2 are brought into contact with the TFT substrate 2, and thereby the structures P1 and P2 higher in the area density sustain the cell gap G2; accordingly, unevenness in the cell gap can be suppressed from occurring. Furthermore, since the structures C2 and C3 that constitute the structures P1 and P2 have a function as an alignment control structure, a region of wrongly aligned liquid crystal can be inhibited from occurring; accordingly, a liquid crystal display device that does not exhibit display defect and does not cause a decrease in the transmittance can be obtained.

What is claimed is:

1. A liquid crystal display device comprising:
   a pair of substrates attached through a sealing material coated in seamless manners on an entire circumference of an outer periphery;
   a liquid crystal sealed between the pair of substrates;
   a structure P1' that comes into contact with both of the pair of substrates and sustains a predetermined cell gap G1; and
   a structure P2 that, when a pressure is externally applied, sustains a cell gap G2 that is narrower than the cell gap G1; and
   an alignment control structure that is formed on at least one of the pair of substrates for controlling an alignment of the liquid crystal,
   wherein the alignment control structures are formed with different formation patterns between a region in the neighborhood of the structure P1' and other regions, and
   wherein a height Hp1' of the structure P1' and a height Hp2 of the structure P2 satisfy a relationship of $Hp1' \cong G1 > Hp2$.

2. A liquid crystal display device as set forth in claim 1, wherein an area density D1 of the structure P1' and an area density D2 of the structure P2 satisfy a relationship of $D1 \leq D2$.

3. A liquid crystal display device as set forth in claim 1, wherein an upper base area S1 of the structure P1' and an upper base area S2 of the structure P2 satisfy a relationship of $S1 \leq S2$.

4. A liquid crystal display device as set forth in claim 1, wherein the alignment control structures are formed with different formation patterns between a region in the neighborhood of the structure P2 and other regions.

* * * * *